A. G. Tompkins.
Screw Propeller.

No. 31,838. Patented Mar. 26, 1861.

Witnesses.
Lewis A. Tucker

Inventor.
Abram G Tompkins

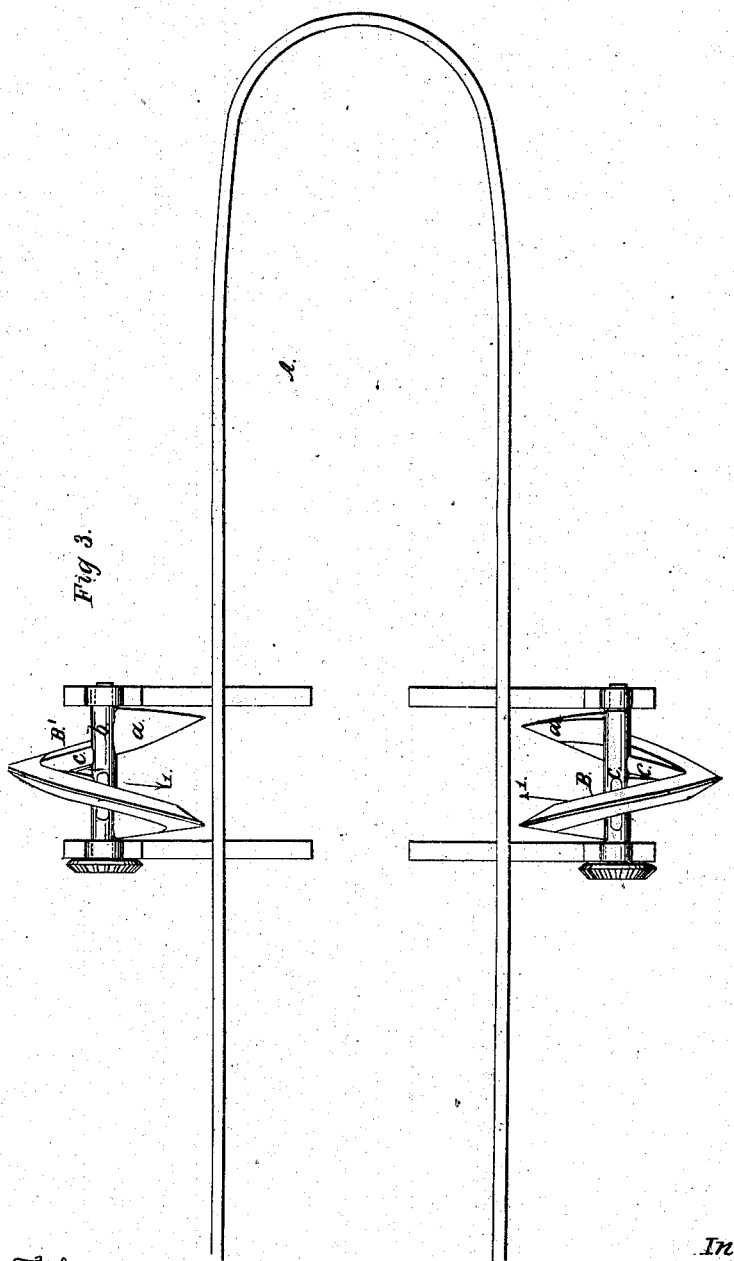

UNITED STATES PATENT OFFICE.

ABRAM G. TOMPKINS, OF NEW YORK, N. Y.

SCREW-PROPELLER.

Specification of Letters Patent No. 31,838, dated March 26, 1861.

*To all whom it may concern:*

Be it known that I, ABRAM G. TOMPKINS, of the city, county, and State of New York, have invented a new and Improved Propeller for Vessels of Navigation; and I do hereby declare that the following is a full, clear, and exact description of the same, reference being had to the annexed drawings, making a part of this specification, in which—

Figure 1:
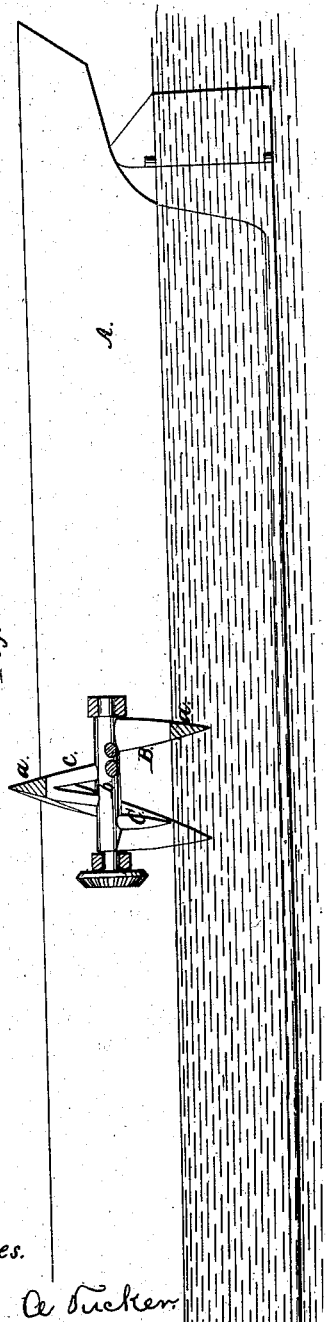
Figure 2:
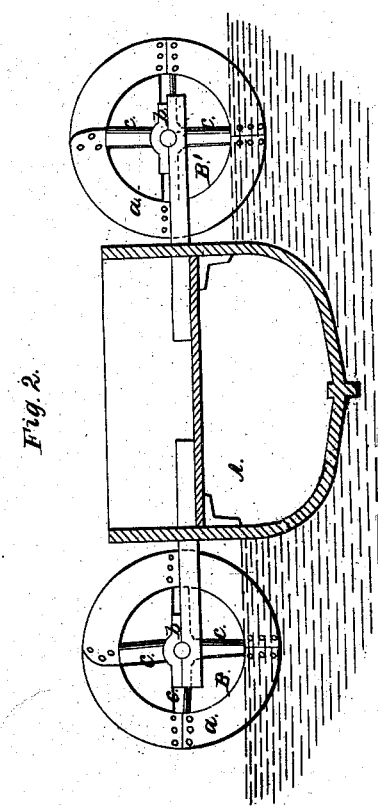

Figure 1 is a side view of a vessel with my invention applied to it. Fig. 2 is a transverse section of the same. Fig. 3 is a plan or top view of the same.

Similar letters of reference indicate corresponding parts in the several figures.

To enable those skilled in the art to fully understand and construct my invention I will proceed to describe it.

A represents a vessel of navigation, which may be constructed in any of the known forms; and B, B', are two propellers, which are placed one at each side of the vessel, about in the same place that the ordinary paddle wheels are placed. The propellers are made in the form of screws, or they may be described as being spiral flanches of skeleton form, to wit; a rim or blade $a$, connected to a shaft $b$, by arms $c$. The propeller B, is a right-hand, and the propeller B', a left-hand one, and they are made to rotate in reverse directions, as indicated by the arrows in Fig. 3; they are large in diameter equal to ordinary paddle wheels, that is to say, in applying them to vessels they would correspond in diameter to paddle-wheels which would be used or considered suitable for the vessel. The shafts $a$, of the propellers are placed in suitable bearings at the side of the vessel, the shafts having a longitudinal position with the vessel, and at such a height that the blades $a$, will be submerged—see Fig. 2. The propellers may be constructed of wood or metal and may be formed of one revolution or coil of a screw, although I do not confine myself to any particular number of coils, nor to any degree of "pitch."

By this invention there will be no unnecessary friction attending the operation of the propellers, as is the case with the submerged propellers. The latter are comparatively small in diameter and placed at the stern of the vessel and rotate quite rapidly producing considerable commotion in the water. My propellers being large in diameter rotate much slower than the ones hitherto used and their blades work smoothly in the water, all concussions being avoided and the vessel is consequently not subjected to the straining and racking attending the use of paddle-wheels. Another advantage my invention possesses is that weeds and trash cannot catch on them and be wound around them as is the case with the submerged propeller. Contingencies of this kind not infrequently break and disable the ordinary submerged propellers.

The blades $a$, of my propellers are of V-form in their transverse section, as shown in Fig. 1. This form admits of the propellers working backward as well as forward; this feature is important in backing a vessel. The V shaped form also causes the periphery of the propeller to press vertically upon the surface of the water; and as the propeller is not to be submerged, but only the lower part of the V shaped edge is intended to dip into the water, all lifting of back water will be prevented. This propeller therefore operates upon the surface of the water like the common paddle wheel. But instead of the broken edge or surface presented by the paddles or blades, my improved propeller presents a continuous revolving V shaped edge, which presses down upon the water and acts thereupon without churning it into foam, or raising back water.

Having thus described my invention what I claim as new and desire to secure by Letters Patent, is—

Constructing the propeller with a flaring edged felly or continuous rim $a$ supported upon separate spokes or arms ($c$) that radiate from the driving shaft $b$, all in the manner and for the purpose herein shown and described.

ABRAM G. TOMPKINS.

Witnesses:
LEWIS A. TUCKER,
M. M. LIVINGSTON.